United States Patent [19]

Bhasker

[11] Patent Number: 5,511,075
[45] Date of Patent: Apr. 23, 1996

[54] METHOD AND APPARATUS FOR BRIDGING CONCURRENT VOICE AND DATA AND SVD COMMUNICATION ENDPOINTS

[75] Inventor: Narjala Bhasker, Portland, Oreg.

[73] Assignee: Intel Corporation, Santa Clara, Calif.

[21] Appl. No.: 315,879

[22] Filed: Sep. 30, 1994

[51] Int. Cl.[6] .................................................. H04L 12/66
[52] U.S. Cl. ................................. 370/85.13; 370/110.1
[58] Field of Search .................................. 375/216, 220; 379/93, 94; 370/49.5, 60.1, 85.13, 85.14, 97, 99, 110.1, 119

[56] References Cited

U.S. PATENT DOCUMENTS

| | | | |
|---|---|---|---|
| 5,077,735 | 12/1991 | Myung et al. | 370/49.5 |
| 5,208,811 | 5/1993 | Kashio et al. | 370/85.13 |
| 5,309,440 | 5/1994 | Nakamura et al. | 370/97 |
| 5,410,754 | 4/1995 | Klotzbach et al. | 370/85.13 |

*Primary Examiner*—Benedict V. Safourek
*Attorney, Agent, or Firm*—Blakely, Sokoloff, Taylor & Zafman

[57] ABSTRACT

A two way ISDN-SVD bridge is provided to bridge communications between an ISDN and a SVD communication endpoint. The bridge comprises a micro-controller, a data pump, an audio DSP, a CODEC, an ISDN interface, and a DAA. The micro-controller responsive to events and commands from the ISDN and SVD endpoints, controls operation of the bridge. In particular, it operates the bridge in one of at least four modes, an idle mode, a bridging voice only mode, a bridging voice and data mode, and a bridging data only mode.

24 Claims, 4 Drawing Sheets

METHOD AND APPARATUS FOR BRIDGING CONCURRENT VOICE AND DATA AND SVD COMMUNICATION ENDPOINTS

BACKGROUND OF THE INVENTION

1. Field of the Invention

The present invention relates to the field of Data Communication. More specifically, the present invention relates to bridging communication endpoints that employ Integrated Services Digital Network (ISDN) compliance data circuit terminating equipments (DCEs) and communication endpoints that employ Simultaneous Voice and Data (SVD) enabled data circuit terminating equipments (DCEs).

2. Background Information

A communication endpoint employing an ISDN compliance DCE (hereinafter ISDN endpoint) having a Low cost Basic Rate Interface (BRI) ISDN adapter supports two ISDN bearer or B-channels. A BRI ISDN adapter allows a data call to be placed on one channel and a voice call to be placed on the other channel. Normally, International Telecommunication Union - Telecommunication Standardization Sector (ITU-T) Recommendation V.120 error correction protocol is employed to provide error free data communication. A user may engage in a voice call with a traditional analog telephone endpoint, or a voice and/or data call with another ISDN endpoint, thereby allowing the user to engage in applications such as personal conferencing that require a data channel for data transmission and a voice channel for voice transmission with the other ISDN user.

On the other hand, a communication endpoint employing a SVD enabled DCE (hereinafter a SVD endpoint) has only one analog telephone line. The SVD enabled DCE is capable of making only one call. However, the SVD enabled DCE is capable of operating in multi-modes, including a voice only mode, a SVD mode and a data only mode. When operating in the SVD mode, voice and data are multiplexed over two logical connections established for the single call, for example logical channels 31 and 0 of a ITU-T V.42 modem connection. Thus, the SVD enabled DCE is nevertheless capable of making either a voice call with a traditional analog phone endpoint or a voice and/or data call with another similarly equipped endpoint, thereby also allowing the user to engage in applications such as personal conferencing that require a data channel for data transmission and a voice channel for voice transmission with the other SVD user.

Since low cost ISDN compliance DCEs are not designed with modem emulation capability, and SVD enabled DCEs are not designed to engage in two calls over two channels, ISDN and SVD endpoints are unable to connect to each other. Thus, it is desirable to bridge these two types of communication endpoints. As will be disclosed in more details below, the present invention provide a method and apparatus for bridging ISDN and SVD endpoints that achieve these and other objectives.

For further information on SVD calls, see copending U.S. patent application Ser. No. 08/265,455, filed on Jun. 24, 1994, entitled Method and Apparatus For Making A Multi-Modal Voice And/or Data Call Over A Single Analog Telephone Line, assigned to the assignee of the present invention.

SUMMARY OF THE INVENTION

The present invention advantageously achieves the desired results by providing a two way ISDN-SVD bridge. The bridge comprises a micro-controller, a data pump, an audio digital signal processor (DSP), and an analog to digital and digital to analog converter (CODEC). Additionally, the bridge comprises an ISDN interface and a data equipment attachment adapter circuitry (DAA).

The ISDN interface is used for connecting to an ISDN communication endpoint at one end of the bridge, and the DAA is used for connecting to a SVD communication endpoint at the other end of the bridge. The data pump, the audio DSP, and the CODEC perform their respective traditional functions. The micro-controller responsive to events and commands from the ISDN and SVD endpoints, controls operation of the bridge. In particular, it operates the bridge in one of four modes, an idle mode, a bridging voice only mode, a bridging voice and data mode, and a bridging data only mode.

The micro-controller responsive to a call from either an ISDN endpoint or a SVD endpoint while it is in the idle mode, causes a voice call to be made with the other endpoint, operates the bridge in the bridging voice only mode, and transfers voice between the ISDN voice call and the SVD call.

From the bridging voice only mode, the micro-controller returns the bridge to the idle mode, upon detecting termination of either one of the voice calls. Alternatively, the micro-controller responsive to either a data call from the ISDN endpoint or a SVD start up signal from the SVD endpoint, causes either a SVD connection to be made with the SVD endpoint or a data call to be made to the ISDN endpoint, operates the bridge in the bridging voice and data mode, and transfers voice as well as data between the two ISDN calls and the SVD call.

From the bridging voice and data mode, the micro-controller returns the bridge to the bridging voice only mode, upon either detecting termination of the ISDN data call, or receiving a data disconnect command from the SVD endpoint. Alternatively, the micro-controller responsive to either detecting termination of the ISDN voice call or receiving a voice disconnect command from the SVD endpoint, causes the ISDN voice call to be terminated for the latter case, operates the bridge in the bridging data only mode, and transfers only data between the ISDN data call and the SVD call.

From the bridging data only mode, the micro-controller returns the bridge to the bridging voice and data mode, upon either receiving an ISDN voice call from the ISDN endpoint, or receiving a voice restart command from the SVD endpoint. Alternatively, the micro-controller responsive to detecting termination of either the ISDN data call or the SVD call, causes the other call to be also terminated, and return the bridge to the idle mode.

BRIEF DESCRIPTION OF DRAWINGS

The present invention will be described by way of exemplary embodiments but not limitations illustrated in the accompanying drawings in which like references denote similar elements, and in which.

DETAILED DESCRIPTION

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatic or block diagram form in order not to obscure the present invention.

Figure 1:
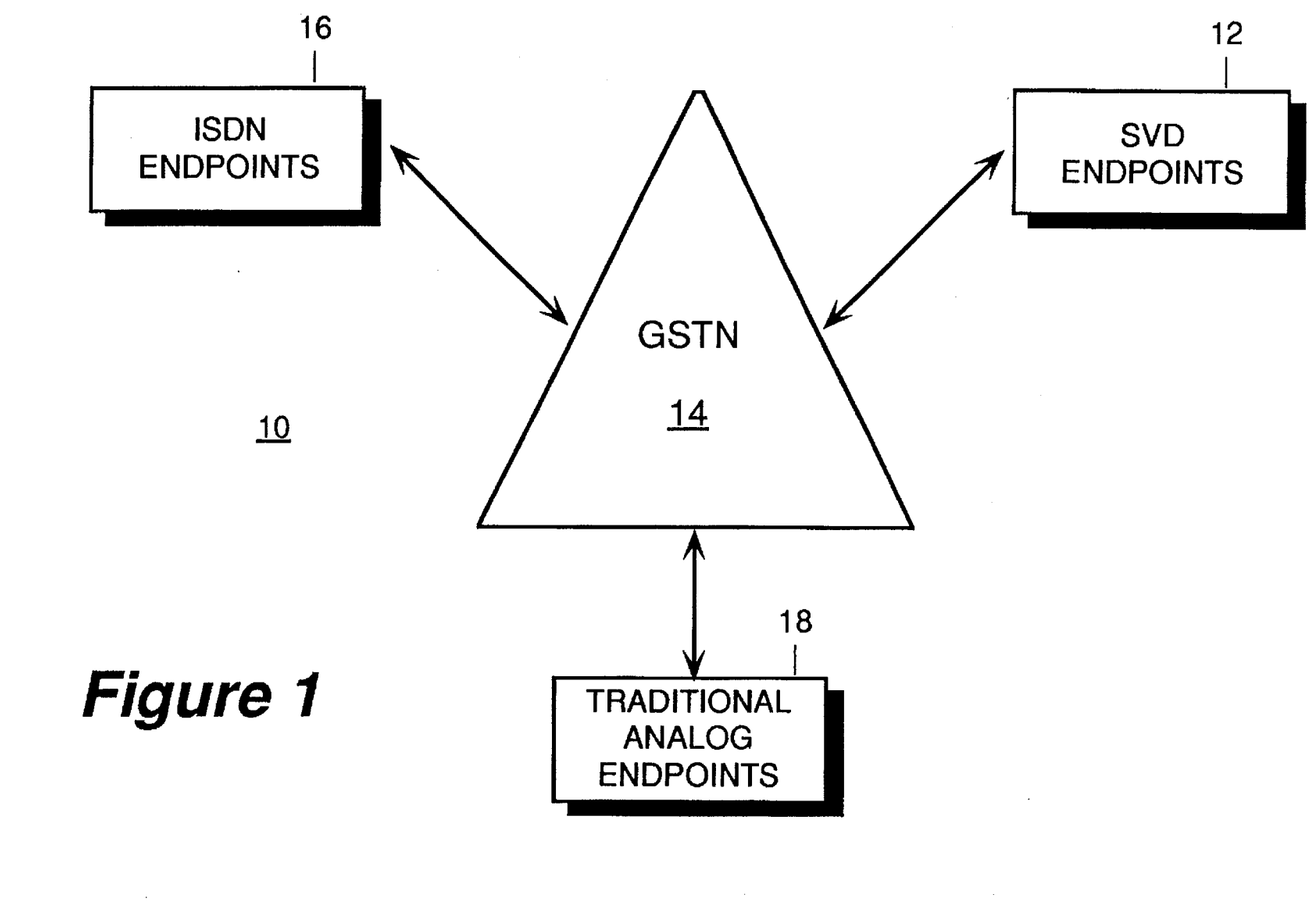
FIG. 1 illustrates a network of traditional analog, ISDN compliance, and SVD enabled communication endpoints, incorporating the teachings of the present invention.

Referring now to FIG. 1, a block diagram illustrating a network of communication endpoints incorporating the teachings of the present invention is shown. Shown are various communication endpoints 12, 16, and 18 coupled to each other through a general switched telephone network (GSTN) 14 incorporated with the teachings of the present invention. The communication endpoints include traditional analog endpoints 18, ISDN endpoints 16 having ISDN compliance DCEs, and SVD endpoints 12 having SVD enabled DCEs. The GSTN 14 includes a number of ISDN-SVD bridges of the present invention for bridging communications between ISDN and SVD endpoints 16 and 12.

The traditional analog and the ISDN endpoints 18 and 16 are well known and will not be further described. For a more detailed description of the SVD endpoints 12, see the above identified U.S. Patent Application. Except for the ISDN-SVD bridge of the present invention which will be described in more detail below with references to the remaining Figures, the GSTN 14 is also well known and will not be otherwise further described either.

Figure 2:
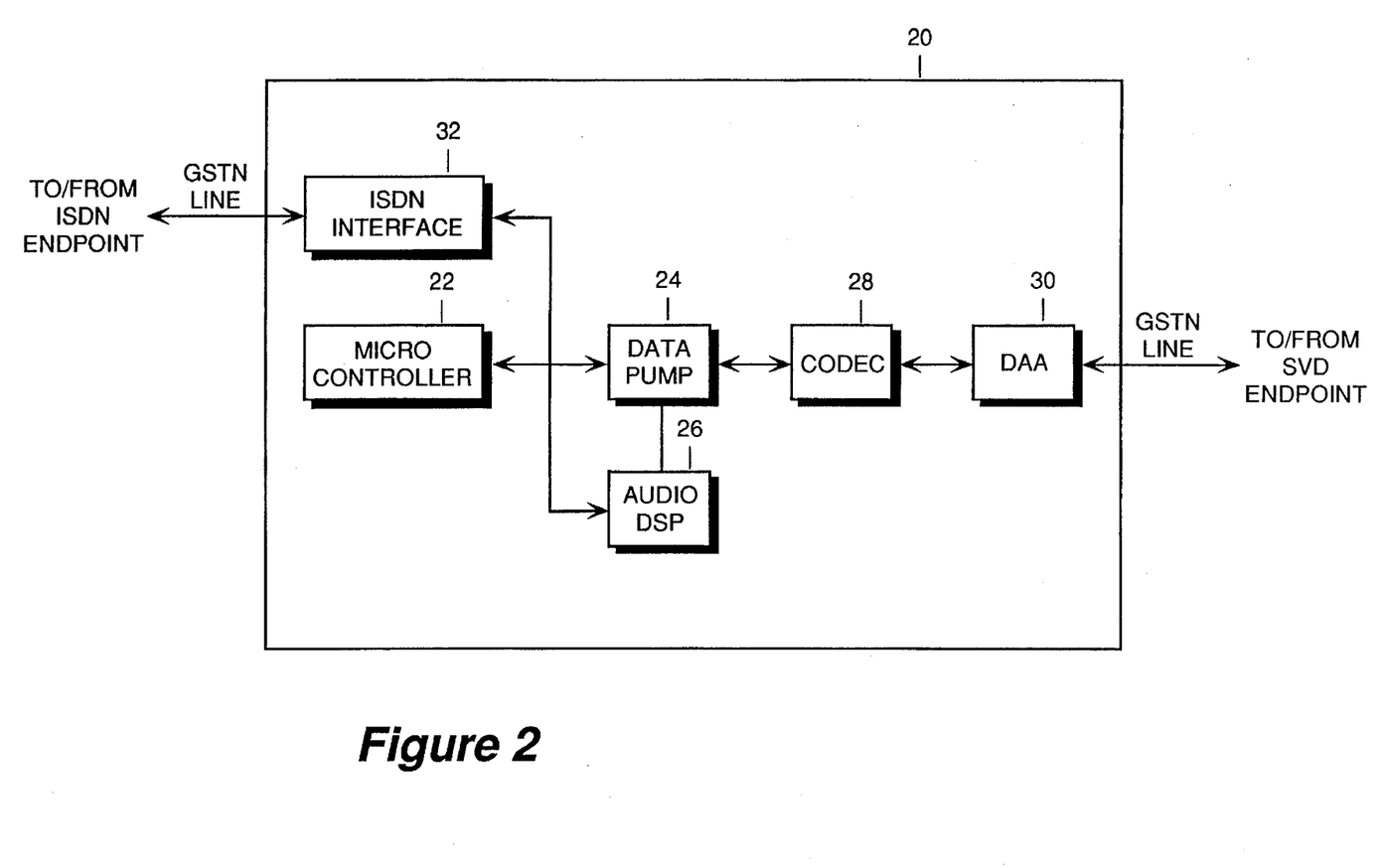
FIG. 2 illustrates the major hardware components of the two way ISDN-SVD bridge of the present invention.

Referring now to FIG. 2, a block diagram illustrating one embodiment of one ISDN-SVD bridge of the present invention is shown. An ISDN-SVD bridge 20 in accordance to the present invention comprises an enhanced micro-controller 22 incorporating teachings of the present invention. In addition, the ISDN-SVD bridge 20 comprises an ISDN interface 32 and a DAA 30. Furthermore, the ISDN-SVD bridge 20 comprises a data pump digital signal processor 24, an audio digital signal processor 26, and an analog to digital and digital to analog converter (CODEC) 28.

The ISDN interface 32 is used to connect an ISDN endpoint to one end of the bridge, whereas the DAA 30 is used to connect a SVD endpoint to the other end of the bridge. The micro-controller 22 controls the operation of the ISDN-SVD bridge 20 bridging the voice and/or data communications between the ISDN and the SVD endpoints. As will be described in more detail below, the micro-controller 22 operates the ISDN-SVD bridge 20 in at least four modes, transitioning the ISDN-SVD bridge 20 between these operating modes responsive to events and/or commands. The data pump 24, the audio DSP 26, and the CODEC 28 perform their respective traditional functions in an SVD enabled DCE. Specifically, audio DSP 26 is used to compress and decompress digitized speech.

The ISDN interface 32, the DAA 30, the data pump 24, the audio DSP 26, and the CODEC are intended to represent a broad category of these elements found in many DCEs. Their functions and constitutions are well known, thus will not be further described. The micro-controller 22 may be implemented with one of any number of micro-controllers or microprocessors known in the art. The bridging logic will be described in detail below.

Figure 3:
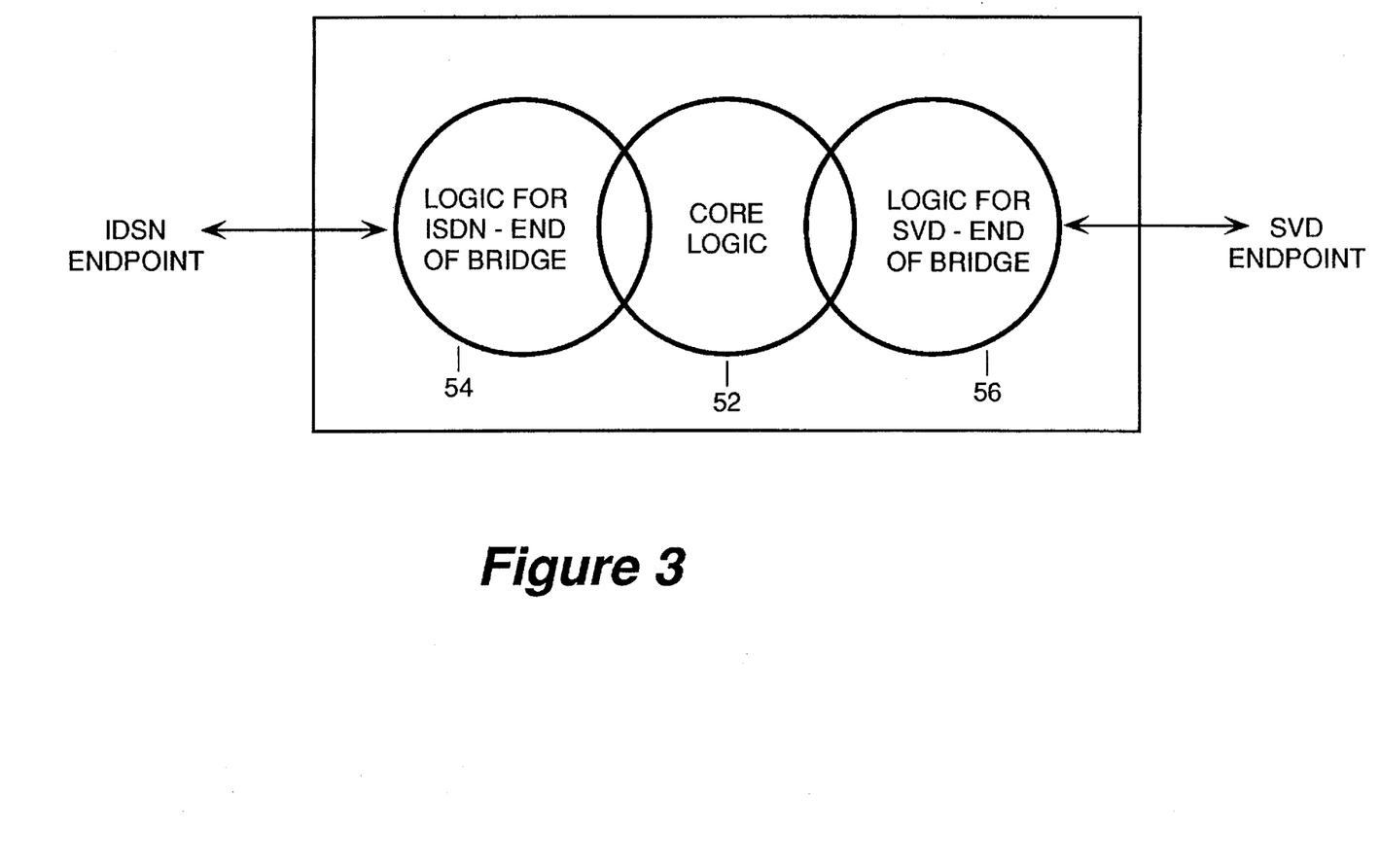
FIG. 3 illustrates a logical view of the two way ISDN-SVD bridge.
Figure 4:
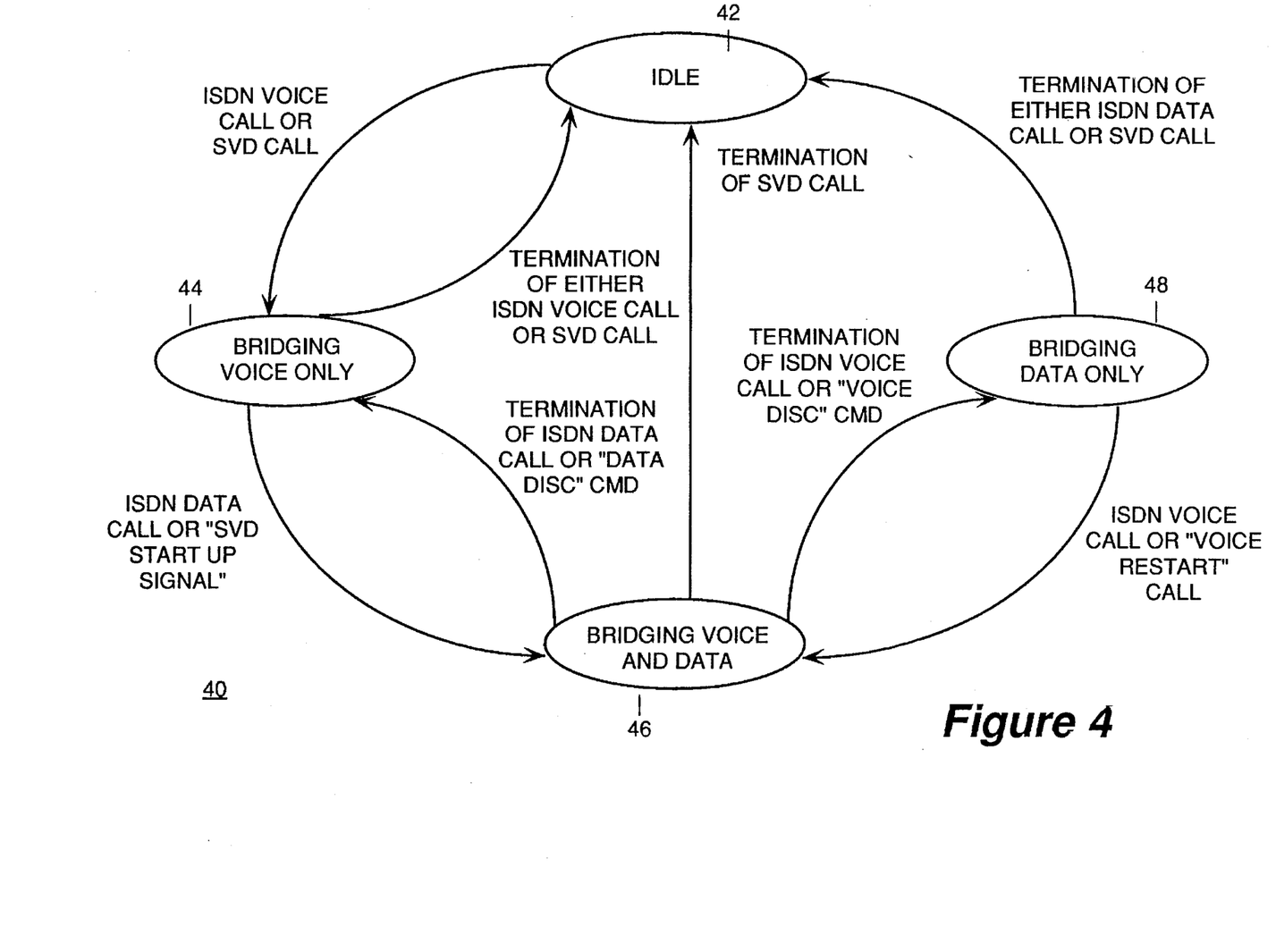
FIG. 4 illustrates the four operating modes for one embodiment of the two way ISDN-SVD bridge.

Referring now to FIGS. 3-4, two block diagrams illustrating the operating logic of the micro-controller is shown.

Referring first briefly to FIG. 3, where a high level view of the operating logic of the micro-controller is illustrated. From this high level view, the operating logic includes the core bridging logic 52, the logic for operating the ISDN-end of the bridge 54, and the logic for operating the SVD-end of the bridge 56. Together, as illustrated by FIG. 4, they operate the bridge in at least four modes, an idle mode, a bridging voice only mode, a bridging voice and data mode, and a bridging data only mode.

From the idle mode 42, upon receiving either an ISDN voice call at the ISDN end of the bridge or a call at the SVD end of the bridge, the micro-controller 22 places the ISDN-SVD bridge 20 in the bridging voice only mode 44 and operates the ISDN-SVD bridge 20 accordingly. Under the bridging voice only mode 44, the micro-controller 22 causes voice signals to be transferred from the ISDN end of the bridge to the SVD end of the bridge and vice versa.

If the transition into the bridging voice only mode 44 is resulted from the receipt of an ISDN voice call from an ISDN endpoint, the micro-controller 22 causes a call to be made to the SVD endpoint, jointly with the SVD endpoint operate the connection between the SVD end of the bridge and the SVD endpoint in an "Analog Voice Mode". The SVD endpoint is identified by the ISDN voice call. If on the other hand, the transition into the bridging voice only mode 44 is resulted from the receipt of a call from a SVD endpoint, the micro-controller 22 jointly with the SVD endpoint operate the connection between the SVD end of the bridge and the SVD endpoint in an "Analog Voice Mode", and causes an ISDN voice call to be made to the ISDN endpoint. The ISDN endpoint is identified by the call from the SVD endpoint.

One method for jointly operating the connection between the SVD end of the bridge and the SVD endpoint in the "Analog Voice Mode" is described in the above identified copending U.S. patent application Ser. No. 08/265,455, which is hereby fully incorporated by reference. The method for placing an ISDN voice call to the ISDN endpoint to establish a voice connection between the ISDN end of the bridge and the ISDN endpoint is well known, and will not be further described.

From the bridging voice only mode 44, the micro-controller 22 returns the ISDN-SVD bridge 20 to the idle mode 42, upon detecting the termination of the ISDN voice call at the ISDN end of the bridge or the termination of the SVD call at the SVD end of the bridge. Alternatively, the micro-controller 22 places the ISDN-SVD bridge 20 in the bridging voice and data mode 46, upon receipt of an ISDN data call at the ISDN end of the bridge or a "SVD start up signal", and operates the ISDN-SVD bridge 20 accordingly. Under the bridging voice and data mode 46, the micro-controller 22 causes digitized voice as well as data to be transferred from the ISDN end of the bridge to the SVD end of the bridge and vice versa. Audio DSP 26 is used to decompress audio received from the SVD call before transmitting it to the ISDN endpoint and vice versa.

If the transition into the idle mode 42 is resulted from the termination of the ISDN voice call, the micro-controller 22 causes the call with the SVD endpoint to be terminated. If on the other hand, the transition is resulted from the termination of the call with the SVD endpoint, the micro-controller 22 terminates the ISDN voice call with the ISDN endpoint.

If the transition from the bridging voice only mode 44 to the bridging voice and data mode 46 is resulted from the receipt of an ISDN data call, the micro-controller 22 causes a predetermined "SVD start up signal" to be transmitted to the SVD endpoint, and jointly with the SVD endpoint transition the connection between the SVD end of the bridge and the SVD endpoint into a "SVD Mode". If on the other hand, the transition is resulted from the receipt of the predetermined "SVD start up signal" from the SVD endpoint, the micro-controller 22 also jointly with the SVD endpoint transition the connection between the SVD end of the bridge and the SVD endpoint into the "SVD Mode", and places an ISDN data call to the ISDN endpoint, establishing a data connection between the ISDN endpoint and the ISDN end of the bridge.

One method for jointly transitioning the connection between the SVD end of the bridge and the SVD endpoint into the "SVD Mode" is described in copending U.S. patent application Ser. No. 08/265,314, filed on Jun. 24, 1994, assigned to the assignee of the present invention, which is hereby fully incorporated by reference. The method for placing an ISDN data call to the ISDN endpoint to establish a data connection between the ISDN end of the bridge and the ISDN endpoint is well known, and will not be further described.

From the bridging voice and data mode 46, the micro-controller 22 returns the ISDN-SVD bridge 20 to the idle mode 42, upon detecting the termination of the SVD call at the SVD end of the bridge. Alternatively, from the bridging voice and data mode 46, the micro-controller 22 returns the ISDN-SVD bridge 20 to the bridging voice only mode 44, upon detecting the termination of the ISDN data call at the ISDN end of the bridge or receiving a "Data Disconnect" command from the SVD endpoint at the SVD end of the bridge, and operates the ISDN-SVD bridge 20 accordingly. As a further alternative, the micro-controller 22 places the ISDN-SVD bridge 20 in the bridging data only mode 48, upon detecting the termination of the ISDN voice call at the ISDN end of the bridge or receiving a "Voice Disconnect" command from the SVD endpoint at the SVD end of bridge, and operates the ISDN-SVD bridge 20 accordingly. Under the bridging data only mode 48, the micro-controller 22 causes only data to be transferred from the ISDN end of the bridge to the SVD end of the bridge and vice versa, with suitable protocol conversion between V.42 and V.120.

When the micro-controller 22 transitions the ISDN-SVD bridge 20 from the bridging voice and data mode 46 to the idle mode 42, upon detecting termination of the SVD call at the SVD end of the bridge, it terminates both the ISDN voice as well as the ISDN data call at the ISDN end of the bridge.

If the transition from the bridging voice and data mode 46 to the bridging voice only mode 44 is resulted from the termination of the ISDN data call, the micro-controller 22 causes a "Data Disconnect" command to be transmitted to the SVD endpoint, and jointly with the SVD endpoint transition the connection between the SVD end of the bridge and the SVD endpoint into the "Analog Voice Mode". If on the other hand, the transition is resulted from the receipt of the "Data Disconnect" command from the SVD endpoint, the micro-controller 22 also jointly with the SVD endpoint transition the connection between the SVD end of the bridge and the SVD endpoint into the "Analog Voice Mode", and terminates the ISDN data call with the ISDN endpoint.

If the transition from the bridging voice and data mode 46 to the bridging data only mode 48 is resulted from the termination of the ISDN voice call, the micro-controller 22 causes the "Voice Disconnect" Command to be transmitted to the SVD endpoint, and jointly with the SVD endpoint transition the connection between the SVD end of the bridge and the SVD endpoint into a "Data Mode". If on the other hand, the transition is resulted from the receipt of the "Voice Disconnect" command from the SVD endpoint, the micro-controller 22 also jointly with the SVD endpoint transition the connection between the SVD end of the bridge and the SVD endpoint into the "Data Mode", and terminates the ISDN voice call with the ISDN endpoint.

One method for transmitting "Data Disconnect" and "Voice Disconnect" commands, and jointly transitioning the connection between the SVD end of the bridge and the SVD endpoint back into the "Analog Voice Mode" or to the "Data Mode" is described in above incorporated by reference copending U.S. patent application Ser. No. 08/265,455. The method for terminating either the ISDN data call or the ISDN voice call with the ISDN endpoint is well known, and will not be further described.

From the bridging data only mode 48, the micro-controller 22 returns the ISDN-SVD bridge 20 to the bridging voice and data mode 46, upon receiving an ISDN voice call at the ISDN end of the bridge or receiving a "Voice Restart" command from the SVD endpoint at the SVD end of the bridge, and operates the ISDN-SVD bridge 20 accordingly. Alternatively, the micro-controller 22 places the ISDN-SVD bridge 20 in the idle mode 42, upon detecting the termination of the ISDN data call at the ISDN end of the bridge or the termination of the call at the SVD end of bridge, and operates the ISDN-SVD bridge 20 accordingly.

If the transition back to the bridging voice and data mode 46 is resulted from the receipt of the ISDN voice call, the micro-controller 22 causes a "Voice restart" command to be transmitted to the SVD endpoint, and jointly with the SVD endpoint transition the connection between the SVD end of the bridge and the SVD endpoint into the "SVD Mode". If on the other hand, the transition is resulted from the receipt of the "Voice restart" command from the SVD endpoint, the micro-controller 22 also jointly with the SVD endpoint transition the connection between the SVD end of the bridge and the SVD endpoint into the "SVD Mode", and places an ISDN voice call to the ISDN endpoint.

If the transition into the idle mode 42 is resulted from the termination of the ISDN data call, the micro-controller 22 causes the call with the SVD endpoint to be terminated. If on the other hand, the transition is resulted from the termination of the call with the SVD endpoint, the micro-controller 22 terminates the ISDN data call with the ISDN endpoint.

One method for transmitting the "Voice Restart" command, and jointly transitioning the connection between the SVD end of the bridge and the SVD endpoint back into the "SVD Mode" is described in above incorporated by reference copending U.S. patent application Ser. No. 08/265,455.

Thus, a method and apparatus for bridging communications between ISDN and SVD endpoints has been described. While the present invention has been described in terms of the above embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

I claim:

1. An apparatus for bridging communications between a first communication endpoint equipped with an Integrated Services Digital Network (ISDN) compliance data circuit terminating equipment (DCE) and a second communication endpoint equipped with a simultaneously voice and data (SVD) enabled DCE, said apparatus comprising:

(a) first interface circuitry for interfacing with the first communication endpoint;

(b) second interface circuitry for interfacing with the second communication endpoint; and (c) bridging circuitry coupled to the first and the second interface circuitry for operating the apparatus in one of at least four modes responsive to communication events as well as commands from the first and second communication endpoints, wherein the at least four modes include a first mode where the bridging circuitry bridges neither voice nor data between the first and the second interface circuitry, a second mode where the bridging circuitry bridges voice only between the first and the second interface circuitry, a third mode where the bridging circuitry bridges voice as well as data between the first and the second interface circuitry, and a fourth mode where the bridging circuitry bridges data only between the first and the second interface circuitry.

2. The apparatus as set forth in claim 1, wherein the bridging circuitry places the apparatus in the second mode from the first mode and bridges voice only between the first and the second interface circuitry, responsive to either an ISDN voice call from the first communication endpoint or a call from the second communication endpoint while the apparatus was in the first mode.

3. The apparatus as set forth in claim 1, wherein the bridging circuitry returns the apparatus to the first mode from the second mode, responsive to either termination of an ISDN voice call with the first communication endpoint or termination of a call with the second communication endpoint while the apparatus was in the second mode.

4. The apparatus as set forth in claim 1, wherein the bridging circuitry places the apparatus in the third mode from the second mode and bridges voice as well as data between the first and the second interface circuitry, responsive to either receiving an ISDN data call from the first communication endpoint or a predetermined simultaneously voice and data start up signal from the second communication endpoint while the apparatus is in the second mode.

5. The apparatus as set forth in claim 1, wherein the bridging circuitry returns the apparatus to the first mode from the third mode, responsive to termination of a call with the second communication endpoint while the apparatus was in the third mode.

6. The apparatus as set forth in claim 1, wherein, the bridging circuitry returns the apparatus to the second mode from the third mode and bridges voice only between the first and the second interface circuitry, responsive to either termination of an ISDN data call with the first communication endpoint or receipt of a data disconnect command from the second communication endpoint while the apparatus was in the third mode.

7. The apparatus as set forth in claim 1, wherein the bridging circuitry places the apparatus in the fourth mode from the third mode and bridges data only between the first and the second interface circuitry, responsive to either termination of an ISDN voice call with the first communication endpoint or receipt of a voice disconnect command from the second communication endpoint while the apparatus was in the third mode.

8. The apparatus as set forth in claim 1, wherein, the bridging circuitry places the apparatus in the third mode from the fourth mode and bridges voice as well as data between the first and the second interface circuitry, responsive to either receipt of an ISDN voice call from the first communication endpoint or receipt of a voice restart command from the second communication endpoint while the bridging circuitry was in the fourth mode.

9. The apparatus as set forth in claim 1, wherein the bridging circuitry returns the apparatus to the first mode from the fourth mode, responsive to termination of an ISDN data call with the first communication endpoint or termination of a call with the second communication endpoint while the apparatus was in the fourth mode.

10. In a communication bridging device, a method for bridging communications between a first communication endpoint equipped with an Integrated Services Digital Network (ISDN) compliance data circuit terminating equipment (DCE) and a second communication endpoint equipped with a simultaneously voice and data (SVD) enabled DCE, the method comprising the steps of:

a) placing the bridging device in a first operating mode under which neither voice nor data are bridged between an ISDN end and a SVD end of the bridging device;

b) placing the bridging device in a second operating mode from the first operating mode, responsive to either an ISDN voice call from the first communication endpoint or a call from the second communication endpoint while the bridging device is in the first operating mode, wherein under the second operating mode only voice is bridged between the ISDN end and the SVD end of the bridging device; and c) returning the bridging device to the first operating mode from the second operating mode responsive to either termination of an ISDN voice call with the first communication endpoint or termination of the call with the second communication endpoint while the bridging device is operating in the second operating mode.

11. The method as set forth in claim 10, wherein the method further comprises the steps of:

d) placing the bridging device in a third operating mode from the second operating mode, responsive to either receiving an ISDN data call from the first communication endpoint or a predetermined simultaneously voice and data start up signal from the second communication endpoint while the bridging device is operating in the third operating mode, wherein under the third operating mode voice as well as data are bridged between the ISDN end and the SVD end of the bridging device; and e) returning the bridging device to the first operating mode from the third operating mode, responsive to termination of a data disconnect command from the second communication endpoint, f) returning the bridging device to the second operating mode from the third operating mode, responsive to either termination of an ISDN data call with the first communication endpoint or receipt of a data disconnect command from the second communication endpoint, wherein the bridging device is operated as defined in step (b).

12. The method as set forth in claim 11, wherein the method further comprises the steps of:

g) placing the bridging device in a fourth operating mode from the third operating mode, responsive to either termination of an ISDN voice call with the first communication endpoint or receipt of a voice disconnect command from the second communication endpoint while the bridging device is operating in the third operating mode, wherein under the fourth operating mode only data is bridged between the ISDN end and the SVD end of the bridging device;

h) returning the bridging device to the third operating mode from the fourth operating mode, responsive to either receipt of an ISDN voice call from the first communication endpoint or receipt of a voice restart command from the second communication endpoint while the bridging device is operating in the fourth operating mode, wherein the bridging device is operated as defined in step (d); and i) placing the bridging device in the first operating mode from the fourth operating mode, responsive to termination of an ISDN data call with the first communication endpoint or termination of the call with the second communication endpoint while the bridging device is operating in the fourth operating mode.

13. An apparatus for bridging communications between a first communication endpoint equipped with a data circuit terminating equipment (DCE) of a first type that can concurrently conduct a voice call and a data call, and a second communication endpoint equipped with a DCE of a second type that can conduct a simultaneous voice and data (SVD) call, said apparatus comprising:

(a) first interface circuitry for interfacing with the first communication endpoint;

(b) second interface circuitry for interfacing with the second communication endpoint; and (c) bridging circuitry coupled to the first and the second interface circuitry for operating the apparatus in one of at least four modes responsive to communication events as well as commands from the first and second communication endpoints, wherein the at least four modes include a first mode where the bridging circuitry bridges neither voice nor data between the first and the second interface circuitry, a second mode where the bridging circuitry bridges voice only between the first and the second interface circuitry, a third mode where the bridging circuitry bridges voice as well as data between the first and the second interface circuitry, and a fourth mode where the bridging circuitry bridges data only between the first and the second interface circuitry.

14. The apparatus as set forth in claim 13, wherein the bridging circuitry places the apparatus in the second mode from the first mode and bridges voice only between the first and the second interface circuitry, responsive to either a voice call from the first communication endpoint or a call from the second communication endpoint while the apparatus was in the first mode.

15. The apparatus as set forth in claim 13, wherein the bridging circuitry returns the apparatus to the first mode from the second mode, responsive to either termination of a voice call with the first communication endpoint or termination of a call with the second communication endpoint while the apparatus was in the second mode.

16. The apparatus as set forth in claim 13, wherein the bridging circuitry places the apparatus in the third mode from the second mode and bridges voice as well as data between the first and the second interface circuitry, responsive to either receiving a data call from the first communication endpoint or a predetermined simultaneously voice and data start up signal from the second communication endpoint while the apparatus is in the second mode.

17. The apparatus as set forth in claim 13, wherein the bridging circuitry returns the apparatus to the first mode from the third mode, responsive to termination of a call with the second communication endpoint while the apparatus was in the third mode.

18. The apparatus as set forth in claim 13, wherein, the bridging circuitry returns the apparatus to the second mode from the third mode and bridges voice only between the first and the second interface circuitry, responsive to either termination of a data call with the first communication endpoint or receipt of a data disconnect command from the second communication endpoint while the apparatus was in the third mode.

19. The apparatus as set forth in claim 13, wherein the bridging circuitry places the apparatus in the fourth mode from the third mode and bridges data only between the first and the second interface circuitry, responsive to either termination of a voice call with the first communication endpoint or receipt of a voice disconnect command from the second communication endpoint while the apparatus was in the third mode.

20. The apparatus as set forth in claim 13, wherein, the bridging circuitry places the apparatus in the third mode from the fourth mode and bridges voice as well as data between the first and the second interface circuitry, responsive to either receipt of a voice call from the first communication endpoint or receipt of a voice restart command from the second communication endpoint while the bridging circuitry was in the fourth mode.

21. The apparatus as set forth in claim 13, wherein the bridging circuitry returns the apparatus to the first mode from the fourth mode, responsive to termination of a data call with the first communication endpoint or termination of a call with the second communication endpoint while the apparatus was in the fourth mode.

22. In a communication bridging device, a method for bridging communications between a first communication endpoint equipped with a data circuit terminating equipment (DCE) of a first type that can concurrently conduct a voice call and a data call and a second communication endpoint equipped with a DCE of a second type that can conduct a simultaneously voice and data (SVD) call, the method comprising the steps of:

a) placing the bridging device in a first operating mode under which neither voice nor data are bridged between a first end and a second end of the bridging device;

b) placing the bridging device in a second operating mode from the first operating mode, responsive to either a voice call from the first communication endpoint or a call from the second communication endpoint while the bridging device is in the first operating mode, wherein under the second operating mode only voice is bridged between the first end and the second end of the bridging device; and c) returning the bridging device to the first operating mode from the second operating mode responsive to either termination of a voice call with the first communication endpoint or termination of the call with the second communication endpoint while the bridging device is operating in the second operating mode.

23. The method as set forth in claim 22, wherein the method further comprises the steps of:

d) placing the bridging device in a third operating mode from the second operating mode, responsive to either receiving a data call from the first communication endpoint or a predetermined simultaneously voice and data start up signal from the second communication endpoint while the bridging device is operating in the third operating mode, wherein under the third operating mode voice as well as data are bridged between the first end and the second end of the bridging device; and e) returning the bridging device to the first operating mode from the third operating mode, responsive to termination of a data disconnect command from the second communication endpoint, f) returning the bridging device to the second operating mode from the third operating mode, responsive to either termination of a data call with the first communication endpoint or receipt of a data disconnect command from the second communication endpoint, wherein the bridging device is operated as defined in step (b).

24. The method as set forth in claim 23, wherein the method further comprises the steps of:

g) placing the bridging device in a fourth operating mode from the third operating mode, responsive to either termination of a voice call with the first communication endpoint or receipt of a voice disconnect command from the second communication endpoint while the bridging device is operating in the third operating mode, wherein under the fourth operating mode only data is bridged between the first end and the second end of the bridging device;

h) returning the bridging device to the third operating mode from the fourth operating mode, responsive to either receipt of a voice call from the first communication endpoint or receipt of a voice restart command from the second communication endpoint while the bridging device is operating in the fourth operating mode, wherein the bridging device is operated as defined in step (d); and i) placing the bridging device in the first operating mode from the fourth operating mode, responsive to termination of a data call with the first communication endpoint or termination of the call with the second communication endpoint while the bridging device is operating in the fourth operating mode.

* * * * *